United States Patent [19]

Tonooka et al.

[11] Patent Number: 5,775,724
[45] Date of Patent: Jul. 7, 1998

[54] AIRBAG RESTRAINT UNIT AND METHOD OF PRODUCING SAME

[75] Inventors: Masami Tonooka; Yoshio Horiike; Mitutaka Watanabe, all of Fuji, Japan

[73] Assignee: Nihon Plast Co., Ltd., Fuji, Japan

[21] Appl. No.: 636,982

[22] Filed: Apr. 24, 1996

[30] Foreign Application Priority Data

Feb. 14, 1996 [JP] Japan .................................. 8-026586

[51] Int. Cl.$^6$ ........................ B60R 21/20; B60R 21/26
[52] U.S. Cl. ............................... 280/728.2; 280/740
[58] Field of Search ..................... 280/728.2, 740, 280/732, 728.1, 736

[56] References Cited

U.S. PATENT DOCUMENTS

| | | | |
|---|---|---|---|
| 5,344,182 | 9/1994 | Lauritzen et al. | 280/728.2 |
| 5,482,313 | 1/1996 | Ikeya et al. | 280/728.2 |
| 5,484,165 | 1/1996 | Jenkins et al. | 280/728.2 |
| 5,490,690 | 2/1996 | Mihm | 280/728.2 |
| 5,503,425 | 4/1996 | Emambakhsh et al. | 280/728.2 |
| 5,529,332 | 6/1996 | Wipasuramonton | 280/740 |
| 5,533,745 | 7/1996 | Jenkins et al. | 280/728.2 |
| 5,556,124 | 9/1996 | Olson | 280/728.2 |
| 5,588,667 | 12/1996 | Emambakhsh et al. | 280/728.2 |
| 5,588,675 | 12/1996 | Lotspih | 280/732 |

FOREIGN PATENT DOCUMENTS

| | | |
|---|---|---|
| 6-8784 | 1/1994 | Japan . |
| 6-24285 | 2/1994 | Japan . |
| 7-117607 | 5/1995 | Japan . |
| 7-117608 | 5/1995 | Japan . |
| 7-117609 | 5/1995 | Japan . |
| 93/08042 | 4/1993 | WIPO ................. 280/728.1 |

*Primary Examiner*—Peter C. English
*Attorney, Agent, or Firm*—Foley & Lardner

[57] ABSTRACT

An airbag restraint unit for a front seat passenger aside a driver in an automotive vehicle comprises a casing having upper and lower chambers. An inflator for ejecting gas is disposed in the lower chamber of the casing. An airbag is disposed in the upper chamber of the casing to inflate and deploy upon being supplied with gas from the inflator. A mid-retainer is disposed in the casing and located between the inflator and the airbag. The casing includes a first engagement section having opposite first and second engagement surfaces inclined to gradually approach in a direction toward the airbag. First and second installation holes are formed respectively at the first and second engagement surfaces of the casing. The mid-retainer includes a second engagement section having opposite first and second engagement surfaces engaged respectively with the first and second engagement surfaces of the first engagement section of the casing. First and second fastening members are formed projecting respectively from the first and second engagement surfaces of the second engagement section of the mid-retainer. The first and second fastening members of the mid-retainer are inserted respectively into the first and second installation holes of the casing.

12 Claims, 13 Drawing Sheets

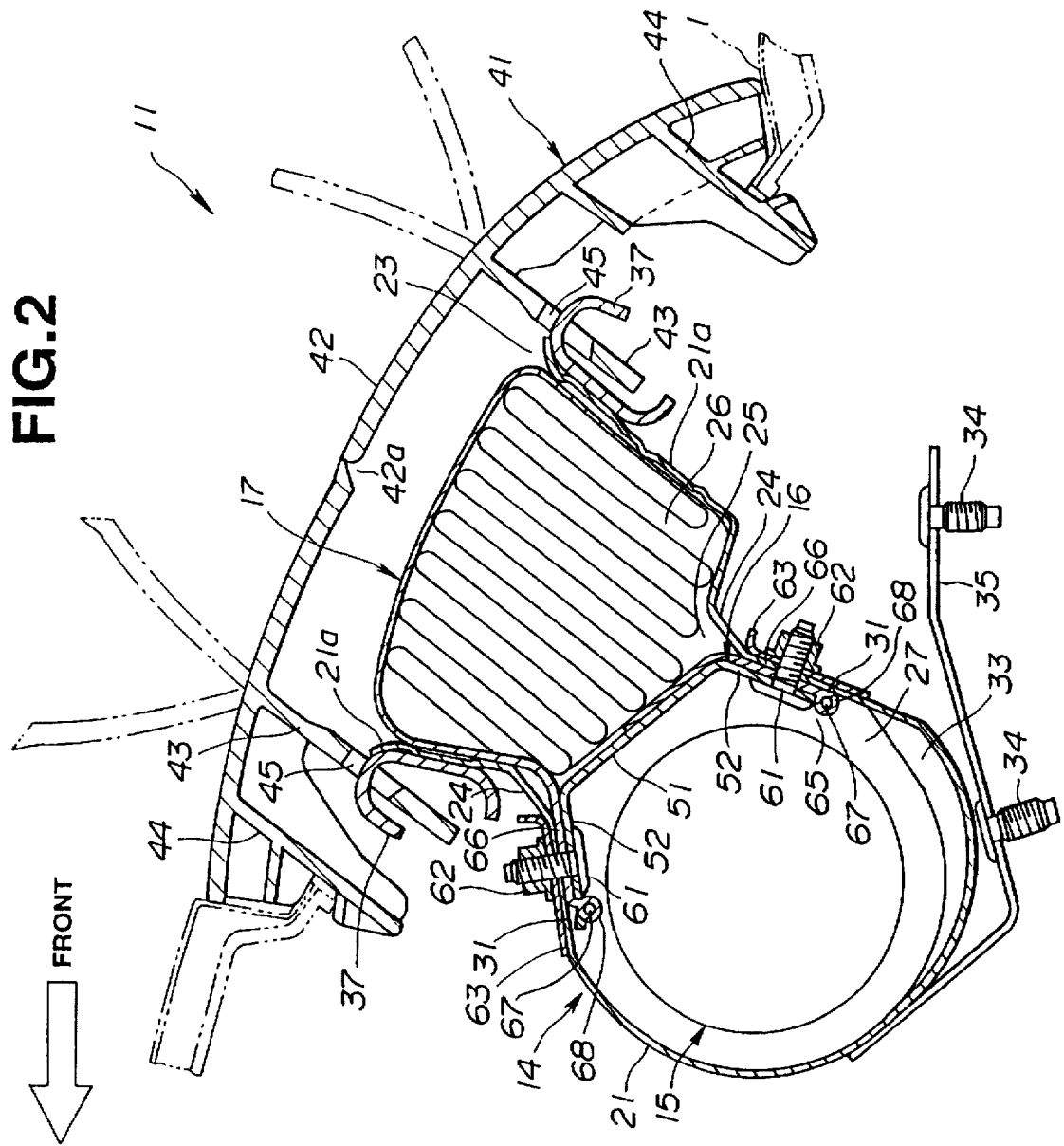

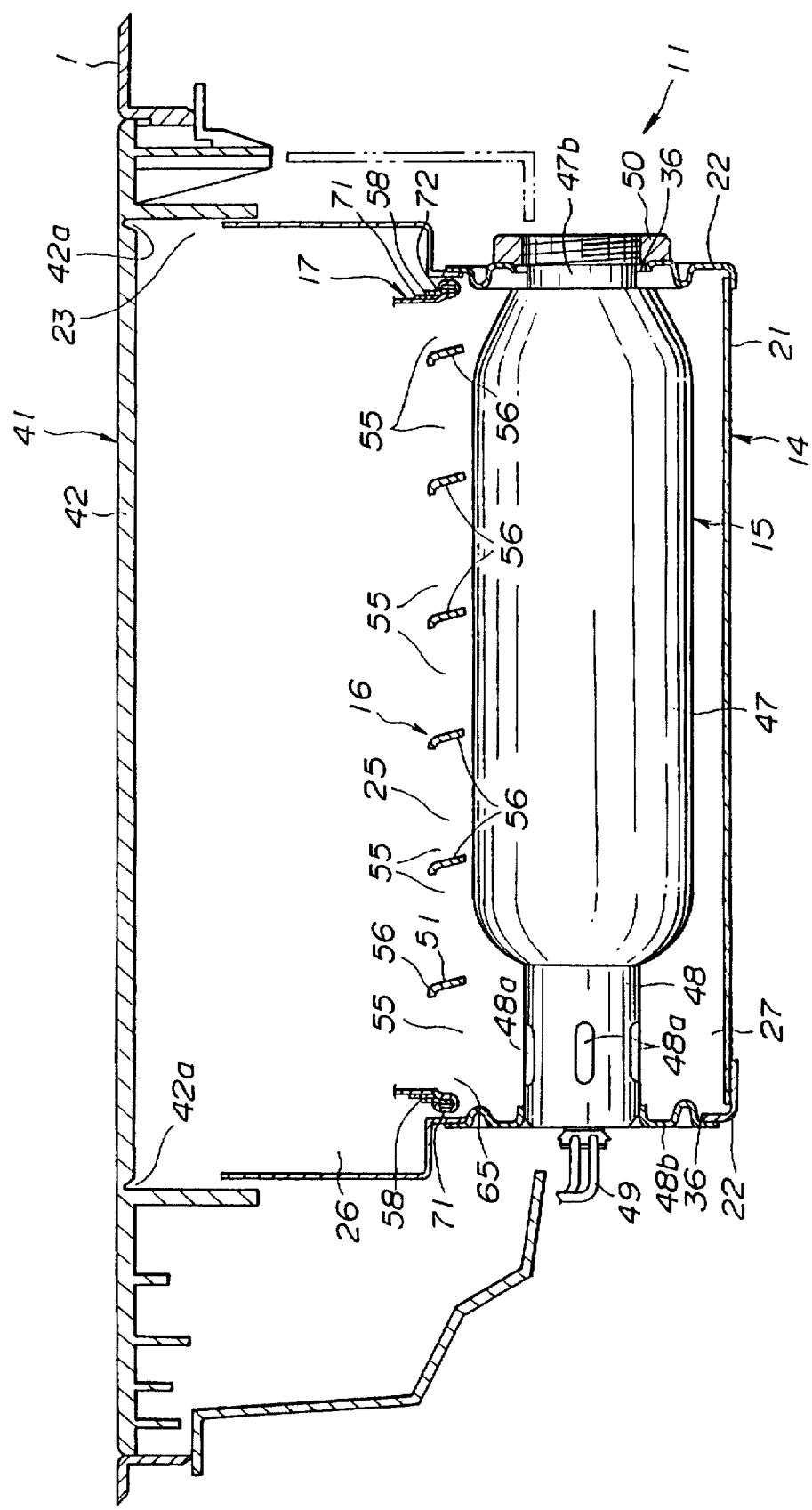

ND METHOD
AIRBAG RESTRAINT UNIT AND METHOD OF PRODUCING SAME

BACKGROUND OF THE INVENTION

1. Field of the Invention

This invention relates to improvements in an airbag restraint unit to be installed, for example, in an instrument panel of an automotive vehicle and suitable for protection of a front seat passenger aside a driver, and to improvements in a method of producing such an airbag restraint unit.

2. Description of the Prior Art

A variety of airbag restraint units have been proposed and put into practical use to protect a front seat passenger located aside a driver in an automotive vehicle. Typical airbag restraint units are disclosed, for example, in Japanese Patent Provisional Publication Nos. 6-8784, 6-24285 and 7-117607. Each airbag restraint unit in these Publications is installed, for example, in an instrument panel of the automotive vehicle and includes a casing for storing an inflator and an airbag. The inflator is adapted to eject gas in response to a signal representative of a vehicular impact. The airbag inflates and deploys under the action of the gas ejected from the inflator.

The casing includes a lower casing for storing the inflator and an upper casing for storing the airbag in a folded state. The lower and upper casings are formed separately and joined with each other. Otherwise, the casing may be formed in a one-piece structure to store therein both the inflator and airbag, in which case a separate mid-retainer is disposed in the casing to separate the airbag from the inflator. In both cases, the casing is mainly made up of two members. The two members are fastened and fixed with separate fastening members such as bolts or rivets under a state wherein the end section of the airbag is fixed between the two members, in which the bolts or rivets are inserted in plural installation holes formed in each airbag and the two members. With the thus arranged airbag restraint unit, when a vehicle collision or the like occurs, high pressure gas is ejected from the inflator and blown into the airbag through openings formed in the lower casing or the mid-retainer. As a result, the airbag inflates and deploys thereby protecting the front seat passenger aside the driver from coming into direct contact with a front windshield or the like.

However, drawbacks have been encountered in the above-discussed conventional airbag restraint unit, in which it is necessary to make troublesome operations such as aligning the locations of the plural installation holes formed in the airbag with the separate members constituting the casing and then inserting a bolt into the aligned installation holes. These operations require a plurality of operational steps and are considerably troublesome because it is particularly difficult to observe the installation hole of the airbag and to align this installation hole with the installation holes of the two members constituting the casing. As a result, it is difficult to lower the production cost of the above conventional airbag restraint unit.

SUMMARY OF THE INVENTION

It is an object of the present invention to provide an improved airbag restraint unit and an improved production method of the airbag restraint unit, which can effectively overcome the drawbacks encountered in conventional airbag restraint units, used for example, for protecting a front seat passenger aside a driver in an automotive vehicle.

An other object of the present invention is to provide an improved airbag restraint unit and an improved production method of the airbag restraint unit, which can facilitate production of the airbag restraint unit while lowering the production cost of the airbag restraint unit.

A further object of the present invention is to provide an improved airbag restraint unit and an improved production method of the airbag restraint unit, by which troublesome operations in an assembly process can be omitted, thereby simplifying the assembly process.

A still further object of the present invention is to provide an improved airbag restraint unit and an improved production method of the airbag restraint unit, in which at least one of a casing and a mid-retainer, as main component parts of the airbag restraint unit, is formed integrally with means for fastening the mid-retainer to the casing thereby simplifying the construction and facilitating the assembly operation of the airbag restraint unit.

An aspect of the present invention resides in an airbag restraint unit comprising a casing. An inflator for ejecting gas is disposed in the casing. An airbag is provided to inflate and deploy upon being supplied with gas from the inflator, the airbag being disposed in the casing. A mid-retainer is disposed in the casing and located between the inflator and the airbag. The casing includes a first engagement section having first and second engagement surfaces that are opposite to each other. The mid-retainer includes a second engagement section having opposite first and second engagement surfaces engageable with the first and second engagement surfaces, respectively, of the first engagement section of the casing. Additionally, at least one of the casing and mid-retainer includes means for fastening the mid-retainer to the casing to establish a state in which the first and second engagement surfaces of the second engagement section are respectively in engagement with the first and second engagement surfaces of the first engagement section, the fastening means being formed integrally with at least one of the casing and mid-retainer.

With this arrangement, the airbag is maintained at a suitable position separate from the inflator by means of the mid-retainer disposed between the inflator and the airbag. The mid-retainer can be fixedly fastened to the inside of the casing in such a manner that the first and second engagement surfaces of the mid-retainer are respectively brought into engagement with the first and second engagement surfaces of the casing. Additionally, at least one of the casing and the mid-retainer is integrally provided with means for fastening the mid-retainer to the casing. This omits locating operations for the installation holes of the mid-retainer and casing, and inserting operations for bolts or the like into the installation holes, required in cases using separate fastening members such as bolts or the likes.

Another aspect of the present invention resides in a method of producing an airbag restraint unit including a casing having an intermediate part, which has a first engagement section, first and second chambers defined in the casing and on opposite sides of the intermediate part, the first chamber being opened at its one end. The unit further includes an inflator for ejecting gas, disposed in the second chamber and an airbag that inflates and deploys upon being supplied with gas from the inflator, the airbag being disposed in the first chamber. Further, a mid-retainer is disposed in the casing and located between the inflator and the airbag, the mid-retainer having a second engagement section engageable with the first engagement section, and an installation section to which the airbag is fixable. The producing method comprises the following steps in the sequence set forth: (a) installing the airbag to the mid-retainer at the installation section; (b) inserting the retainer in an inclined state through the open end of the casing into the second chamber, the retainer being inclined in the inclined state relative to that in an installed state in which the retainer is securely installed to the casing; (c) turning the mid-retainer in a direction toward a position establishing the installed state; and (d) bringing the second engagement section of the retainer into engagement with the first engagement section of the casing to obtain the installed state.

With this production method, the mid-retainer, in a state to be provided with the airbag, is inserted into the second chamber through the intermediate part upon being inclined. Then, the mid-retainer is turned in such a manner that its engagement section is brought into engagement with the engagement section of the casing. Accordingly, it is not required to fasten the airbag simultaneously with fastening of the mid-retainer and the casing, thereby simplifying the operations for assembling the airbag restraint unit.

BRIEF DESCRIPTION OF THE DRAWINGS

In the drawings, like reference numerals designate like elements and parts throughout all figures, in which:

FIG. 2 is a vertical sectional view of the first embodiment of the airbag restraint unit according to the present invention, taken along a plane perpendicular to a longitudinal axis of the unit;

FIG. 3 is another vertical sectional view of the airbag restraint unit of FIG. 2, taken along another plane parallel with the longitudinal axis of the unit;

DETAILED DESCRIPTION OF THE INVENTION

Figure 1A:
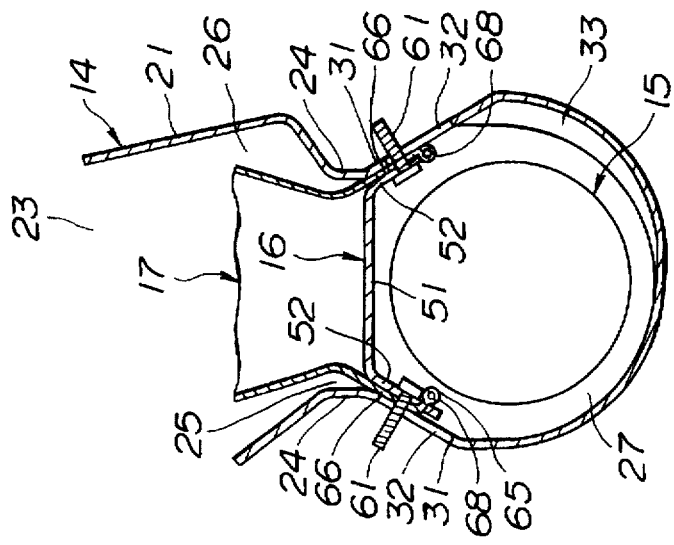
FIGS. 1A to 1C are schematic sectional views showing an assembly process of a first embodiment of an airbag restraint unit according to the present invention.

Referring now to FIGS. 2 and 3, a first embodiment of an airbag restraint unit 11 according to the present invention is generally illustrated by the reference numeral 11. The airbag restraint unit 11 is for a front seat passenger (not shown) aside a driver (not shown) and located inside an instrument panel 1 of an automotive vehicle (not shown). The instrument panel 1 is located inside a passenger compartment of the vehicle and in front of a front seat (not shown) on which the passenger is seated. The airbag restraint unit 11 comprises a casing 14 encasing therein an inflator 15, a mid-retainer 16, an airbag 17 and the like.

Figure 4:
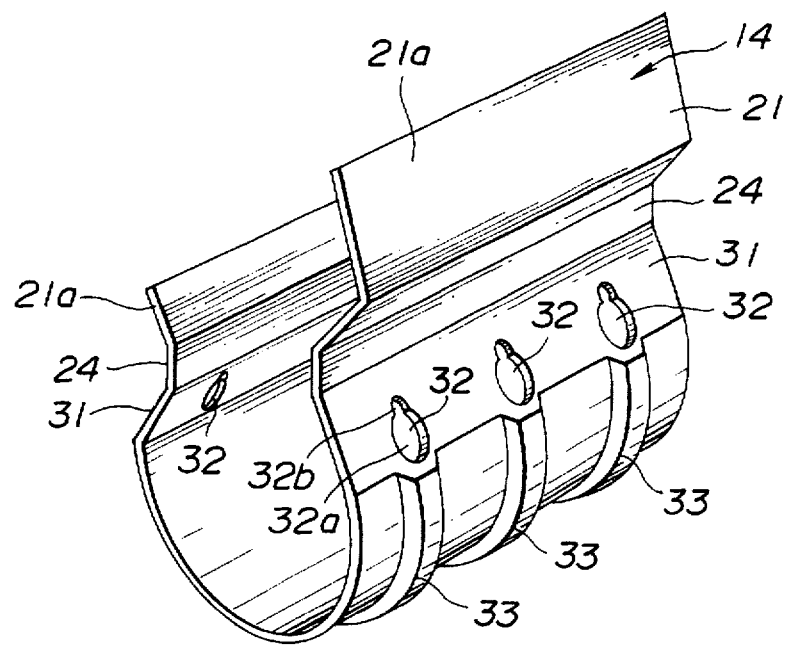
FIG. 4 is a perspective view of a casing forming part of the airbag restraint unit of FIG. 2.

As shown in FIGS. 2 to 4, the casing 14 includes a laterally-extending side plate 21 having a generally U-shaped cross-section and generally channel-shaped. The opened laterally opposite ends of the side plate 21 are covered respectively with end plates 22 fixed to the side plate 21 by spot welding or the like, so that the casing 14 is formed into the shape of a laterally extending container, which may be obtained by deep drawing. The side plate 21 is formed at an intermediate part (in height or depth direction) with inwardly depressed sections 24 facing with and approaching each other. These inwardly depressed sections 24 define therebetween a communication space 25. Front-side and rear-side upper end sections 21a are respectively contiguous to and located above the inwardly depressed sections 24. A first chamber 26 is formed at an upper side of the communication space 25 to house the airbag 17. A second chamber 27 is formed at a lower side of the communication space 25 to house the inflator 15.

Engagement sections 31 are respectively formed contiguous and below the inwardly depressed sections 24 in a manner to face each other. The engagement sections 31 are disposed spaced from each other in a fore-and-aft direction of the automotive vehicle and have their inner surfaces inclined so as to gradually approach each other in a direction toward the first chamber 26. Each engagement section 31 is formed with a plurality of casing-side installation holes 32 aligned in a longitudinal direction of the side plate 21 at predetermined intervals. Three installation holes 32 are formed in this embodiment. Each installation hole 32 includes a circular large hole section 32a and a small hole section 32b contiguous to and located on the large hole section 32a, so that the installation hole 32 is generally keyhole-shaped.

A plurality of (three) guide channels 33 are formed smoothly arcuate and projecting outwardly from the outer peripheral surface of the side plate 21 of the casing 14. Each guide channel 33 extends from the rear side to the bottom side of the side plate 21 and contiguous to the rear-side engaging section 31 having the installation holes 32. It will be understood that each guide channel 33 is formed at its inner surface with a corresponding arcuate groove as viewed. As shown in FIG. 2, the casing 14 is fixedly provided at its bottom section with an installation plate 35 to which bolts 34 are fixedly secured, so that the casing 14 is fixed at its bottom section to a member (not shown) of the vehicle body of the automotive vehicle. As shown in FIG. 3, the opposite end plates 22 are respectively formed at their lower part with inflator installation holes 36. Additionally, as shown in FIG. 2, the front-side and rear-side upper end sections 21a of the side plate 21 of the retainer 14 are respectively fixedly provided near their upper ends with engagement claws (mouth plates) 37 having a generally C-shaped cross-section.

A cover member 41 made of a plastic is installed onto the casing 14 under the action of the engagement claws 37 to cover an upper-side opening 23 formed in the instrument panel 1. More specifically, the cover member 41 includes an upper plate section 42 located generally flush with the instrument panel 1. Front and rear leg sections 43 are formed projecting downwardly from the inner surface of the upper plate section 42. Similarly, installation piece sections 44 are provided projecting from the inner surface of the upper plate section 42 and located in front of and behind the front and rear leg sections 43. The front and rear leg sections 43 are fitted outside the casing 14 and respectively engaged at their through-holes 45 with the engagement claws 37 so that the cover member 41 is fixed in position above the casing 14. The installation piece sections 44 are engaged with the peripheral section of the instrument panel 1, thereby further securely fixing the cover member 41 in position. The upper plate section 42 is formed at its inner surface with a tear line 42a along which a linear portion having a reduced thickness is formed to allow the upper plate section 42 to tear upon inflation of the airbag 17. The tear line 42a is generally H-shaped in plan.

As viewed in FIG. 3, the inflator 15 includes a bomb-shaped main body section 47 provided at an end portion with a gas ejection section 48. The gas ejection section 48 is formed at the outer peripheral surface with a plurality of gas ejection openings 48a. High temperature and pressure gas is ejected through the gas ejection openings 48a in response to a signal (representative of a vehicle collision or the like) transmitted through a lead wire 49 from a controller (not shown), including an impact sensor. The inflator 15 of this embodiment is of a so-called hybrid inflator type where the main body section 47 is formed therein by a gas storage chamber (not shown) and a gas generation chamber (not shown), which chambers are adjacent to each other through a breakable partition wall (not shown). The gas storage chamber is filled with compressed gas, while the gas generation chamber is filled with a solid gas generating agent. It will be understood that the inflator 15 may be of another type where the main body section 47 formed therein with only a gas generation chamber in which an ignitor (not shown) and propellant (not shown) are disposed.

A plate-like lid 48b is fixedly secured to the tip end of the gas ejection section 48. A generally cylindrical bolt portion 47b is formed at the bottom or opposite end portion of the main body section 47. To install the inflator 15 in position, the bolt portion 47b is first inserted from the outside into the casing 14 through one (left-side in FIG. 3) inflator installation hole 36 formed in the end plate 22, and then it is projected to the outside of the casing 14 through another inflator installation hole 36 formed in the opposite end plate 22. Then, a nut member 50 is engaged on the bolt portion 47b and tightened under a state in which the lid 48b is fitted in the inflator installation hole 36, so that the inflator 15 is fixed in position within the second chamber 27 of the casing 14.

Figure 5:
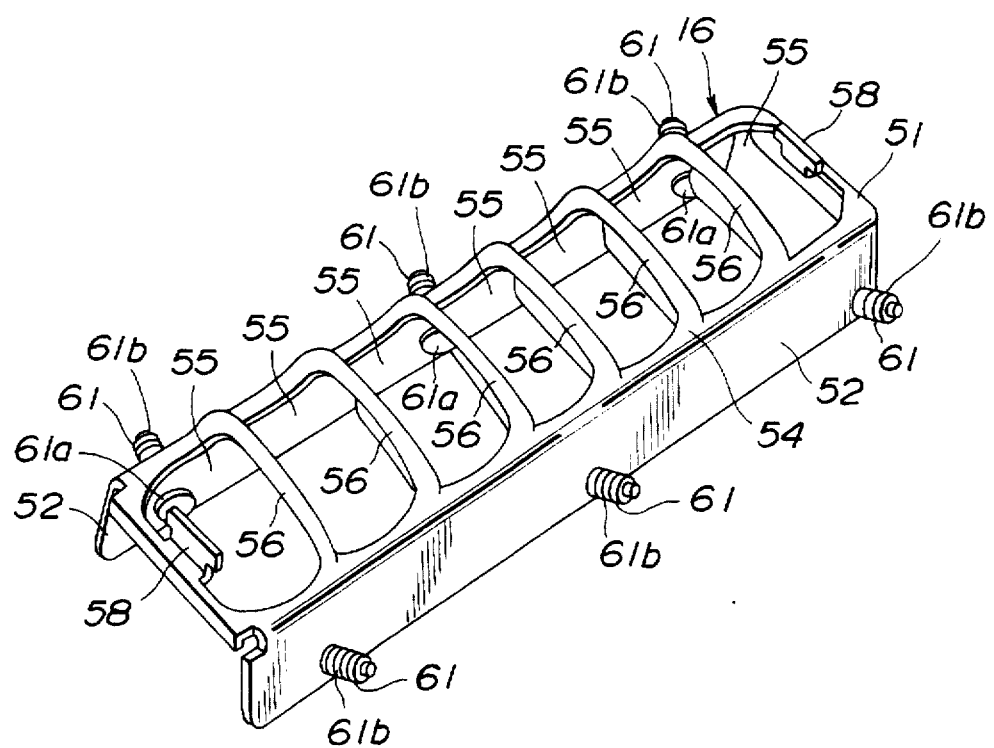
FIG. 5 is a perspective view of a mid-retainer forming part of the airbag restraint unit of FIG. 2.

As shown in FIGS. 2, 3 and 5, a mid-retainer or partition wall member 16 is fixedly disposed at the communication space 25 and includes a base-plate section 51 having a generally rectangular shape in plan. Front-side and rear-side engagement sections 52 are integral with the front-side and rear-side edge portions (not identified) of the base-plate section 51. The engagement sections 52 extend downward and in a longitudinal direction of the base-plate section 51, and incline so that they gradually separate from each other in a downward direction. The base-plate section 51 and the engagement sections 52 are formed as a one-piece structure, for example, by stamping a metal sheet or plate to obtain a blank, and then by bending the blank. The base-plate section 51 is formed with a plurality of through-holes 55 which are aligned in the longitudinal direction of the base-plate section 51 at predetermined intervals, so that a frame portion 54 is left around the through-holes 55. A plurality of louvers 56 are integrally provided on the base-plate section 51 in such a manner that each louver 56 is positioned between the adjacent through-holes 55 so as to regulate the ejection direction of gas passing through the through-holes 55. As viewed in FIG. 3, each louver 56 is inclined in such a manner as to regulate the advancing direction of gas from the gas ejection openings 48a located at one end portion of the casing 14, thereby allowing the airbag 17 to inflate and deploy in a predetermined direction. Additionally, the upper end portion of each louver 56 is bent to be generally horizontal.

Left-side and right-side engagement pieces 58 are respectively formed at the inside edge of the longitudinal opposite end parts of the frame portion 54. Each engagement piece 58 projects upwardly from the frame portion 54 and formed generally T-shaped as viewed from the longitudinal direction of the mid-retainer 16, so that the engagement piece 58 is larger in width in its upper section than in its lower section connected with the frame portion 54. Each engagement piece 58 is formed integral with or fixed to the frame portion 54. Additionally, each engagement section 52 is fixedly provided with fastening bolts (weld bolts) 61 integral with the engagement section 52 and corresponding respectively to the installation holes 32 of the casing 14. More specifically, each bolt 61 has a head section 61a and a threaded section 61b. The threaded section 61b pierces the wall of the engagement section 52 through a hole (not shown) formed in the engagement section 52, so that the head section 61a is in contact with and fixed to the inner surface of the engagement section 52. Thus, the threaded section 61b of each bolt 61 projects over the outside surface of the engagement section 52 as shown in FIG. 5.

As shown in FIG. 2, the mid-retainer 16 is fastened in position inside the casing 14 at the communication space 25 by inserting the bolts 61 into the respective installation holes 32 of the casing 16 and by engaging nuts (M5 nuts according to Japanese Industrial Standard) 62 through a retainer plate 63 on the bolts 61 and tightening the nuts 62 under a state in which the engagement sections 52 of the mid-retainer 16 are respectively in contact with the engagement sections 31 of the casing 14.

As shown in FIGS. 2, 3, 6 and 7, the airbag 17 is disposed in the first chamber 26 of the casing 14 and formed bag-shaped to have an open mouth 65 of a generally rectangular shape, the open mouth 65 capable of being fitted around the mid-retainer 16. For example, the airbag 17 is located on the mid-retainer 16 and stored in the first chamber 26 of the casing 14 under a state in which the airbag 17 is folded in a wave-like form and wound in one direction. As viewed in FIG. 6, the lower part (around the open mouth 65) of the airbag 17 takes generally the shape of a pipe shape having a rectangular cross-section upon being fitted around the mid-retainer 16, in which the lower part of the airbag 17 has front-side and rear-side installation sections 66 located near the bottom peripheral portion defining the open mouth 65. Each installation section 66 is formed with a plurality of installation holes 66a formed corresponding to the installation holes 32 of the casing 14. The bottom edge portion of each installation section 66 is turned up and sewn into the bag-shape. A pin (rod) 67 is inserted in the bag-shaped bottom edge portion of the installation section 66, thereby forming a bulging part 68, which is larger in thickness than the other parts of the airbag 17 and extends in the longitudinal direction of the mid-retainer 16. Further, the lower part of the airbag 17 includes left-side and right-side installation sections 71 located to integrally connect the front-side and rear-side installation sections 66 so that each installation section 71 is generally perpendicular to each installation section 66. The bottom edge portion of each installation section 71 is tongue-shaped and has an installation slit 72. The airbag 17 is further formed with a pair of circular openings (not shown) through which gas within the airbag 17 can be vented.

The airbag 17 is mounted at its open mouth 65 on the mid-retainer 16, upon which the bolts 61 of the mid-retainer 16 are inserted respectively into the installation holes 66a of the airbag 17 while each of the left-side and right-side installation sections 71 is inserted into the through-hole 55 and turned up outwardly upon which each of the left-side and right-side engagement pieces 58 of the mid-retainer 16 is inserted into the engagement slit 72 of each of the left-side and right-side engagement section 71 of the airbag 17. In this state, the mid-retainer 16 is installed to the casing 14, in which each of the front-side and rear-side installation sections 66 of the airbag 17 is put between the corresponding engagement section 31 of the casing 14 and the corresponding engagement section 52 of the mid-retainer 16. Further, in this state, each of the left-side and right-side installation sections 71 is in engagement with the corresponding engagement piece 58, while the bulging part 68 of the airbag 17 is engaged with the lower edge portion of the engagement section 52 of the mid-retainer 16, thereby securely preventing the engagement section 66 of the airbag 17 from getting out through a clearance between the casing 14 and the mid-retainer 16.

The thus arranged airbag restraint unit 11 will operate as follows. When a vehicle collision or the like occurs, the impact of this collision is detected by the controller thereby initializing the inflator 15. Then, the inflator 15 ejects high temperature and pressure nitrogen gas or the like through the gas ejection openings 48a thereof. This gas flows through the through-holes 55 of the mid-retainer 16 to the airbag 17, thereby pushing up the airbag 17, so that the rolled-up airbag 17 comes into collision with the cover member 41 upon rotating. This opens the cover member 41 along the tear line 42a, thereby forming an opening through which the airbag 17 projects. Subsequently, the gas is blown into the airbag 17. The airbag 17 inflates toward the side of the passenger or along a front windshield glass (not shown) of the automotive vehicle, and deploys in front of the front seat passenger aside the driver, thereby effectively protecting the passenger from coming into direct contact with the windshield glass or the like.

Next, an assembly manner of the airbag restraint unit 11 will be discussed mainly with reference to FIG. 1.

Figure 6:
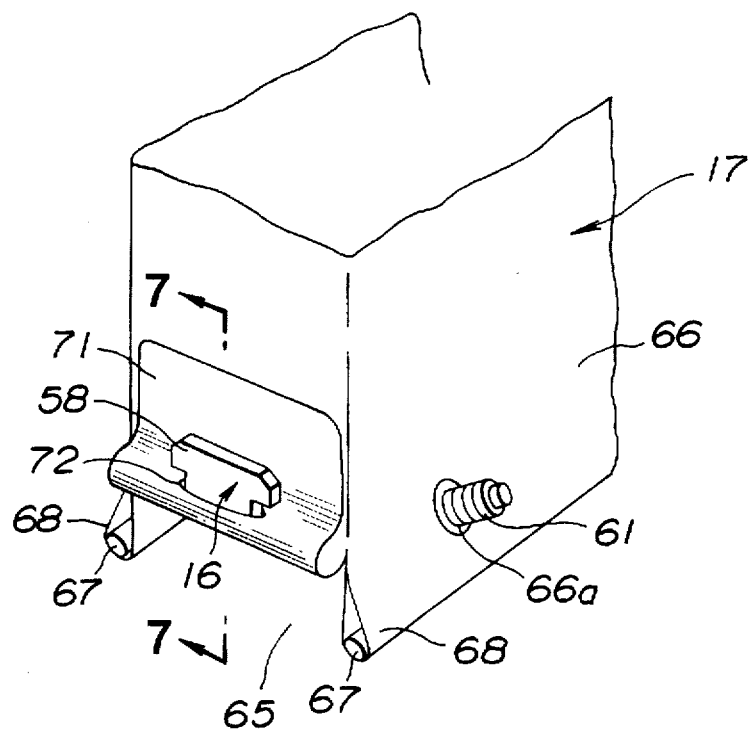
FIG. 6 is a fragmentary perspective view of an airbag forming part of the airbag restraint unit of FIG. 2.
Figure 7:
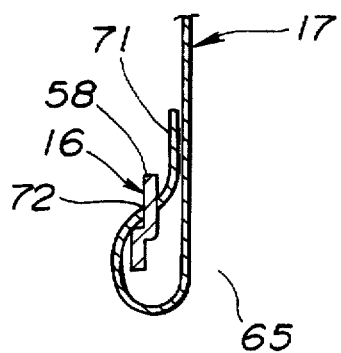
FIG. 7 is a fragmentary sectional view taken in the direction of arrows substantially along the line 7—7 of FIG. 6.

First, as shown in FIGS. 6 and 7, the fastening bolts 61 of the mid-retainer 16 are respectively inserted into the installation holes 66a of the airbag 17 while each of the left-side and right-side installation sections 71 is inserted in the through-hole 55 and then turned up outwardly by about 180° and the engagement piece 58 is inserted into the engagement slit 72. As a result, the airbag 17 is installed to the mid-retainer 16 in an engaging manner.

Then, as shown in FIG. 1A, the mid-retainer 16 with the airbag 17 is inserted through the upper-side opening 23 into the casing 14 in an empty state where the inflator 15 and the like have not yet been installed, and is passed through the communication space 25 maintaining its inclined state so that it may be inserted into the second chamber 27.

Figure 1B:
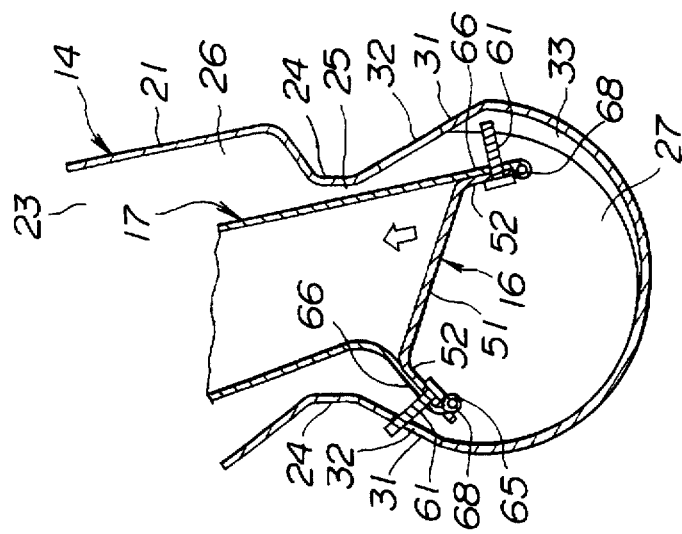
Figure 1C:
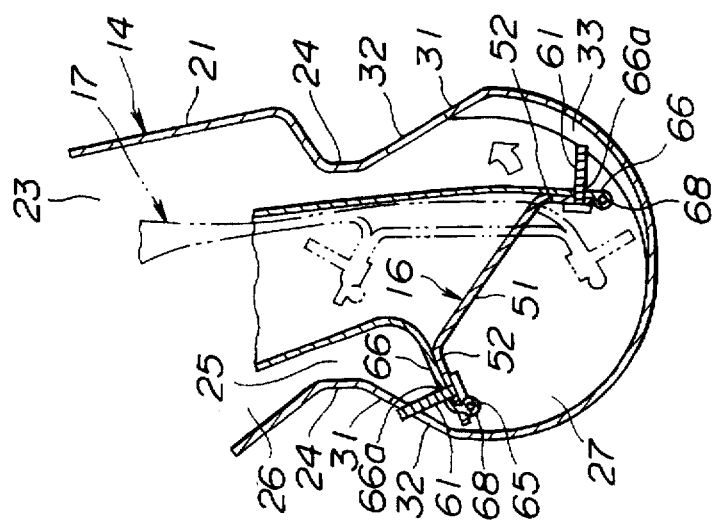

Subsequently, the fastening bolts 61 at the front-side engagement section 52 of the mid-retainer 16 are inserted respectively in the installation holes 32 at the front-side engagement section 31 of the casing 14 to which the guide channels 33 do not extend. Then, as shown in FIGS. 1A and 1B, the tip ends of the fastening bolts 61 at the opposite or rear-side engagement section 52 are fitted respectively in the inside grooves of the guide channels 33 and smoothly guided upwardly so that the mid-retainer 16 is turned in a manner to pull up the fastening bolts 61 to the rear-side engagement section 31. Subsequently, the bolts 61 at the rear-side engagement section 52 of the mid-retainer 16 are inserted into the installation holes 32 at the rear-side engagement section 31 of the casing 14. In a state where the base-plate section 51 of the mid-retainer 16 is in parallel with the communication space 25, the whole mid-retainer 16 is pulled upwardly to establish a state shown in FIG. 1C in which each engagement section 52 of the mid-retainer 16 is brought into contact with the corresponding engagement section 31 of the casing 14, while each installation section 66 of the airbag 17 intervenes therebetween, so that the mid-retainer 16 is engaged, together with the airbag 17, to the casing 14. In this state, as shown in FIG. 2, the nuts 62 are engaged on the respective bolts 61 and tightened, so that the mid-retainer 16 is fixed, together with the airbag 17, to the casing 14.

Thereafter, the airbag 17 is folded and stored in the first chamber 26. Then, the cover member 41 is mounted on the casing 14 to cover the upper-side opening 23. Finally, the inflator 15 is inserted and stored in the second chamber 27 of the casing 14, thus completing the assembly process of the airbag restraint unit 11.

According to the above-mentioned first embodiment airbag restraint unit 11 of the present invention, by virtue of the mid-retainer 16 disposed between the inflator 15 and the airbag 17, the airbag, as stored in the casing 14, is maintained in a suitable position spaced from the inflator 15. The mid-retainer 16 can be fixedly fastened to the casing 14 because it is fastened between the engagement sections 52 of the mid-retainer 16 and the corresponding engagement sections 31 of the casing 14 in which engagement sections are inclined in a manner to gradually approach each other in a direction toward the upside, while the fastening bolts 61 formed integral with and projecting from the engagement sections 52 of the mid-retainer 16 are inserted in the installation holes 32 of the casing 14 to be fastened.

Further, since the plural bolts 61 are formed integral with and projecting from the engagement section 52 of the mid-retainer 16, the mid-retainer 16 and the airbag 17 can be easily assembled to the casing 14, thereby lowering the production cost of the airbag restraint unit 11. In other words, this omits troublesome operations including positioning for plural installation holes formed in a mid-retainer, in an airbag and in a casing, and insertion of bolts in the positioned installation holes, which operations are required in a conventional case where separate fastening members are used. In this regard, according to the first embodiment, the mid-retainer 16 can be inserted into the casing after the bolts 61 are inserted respectively in the installation holes 66a of the airbag 17, thereby facilitating the assembly operation and lowering the production cost of the airbag restraint unit 11.

Furthermore, the casing 14 is formed with the guide channels 33 abutting on the installation holes 32 at the rear-side engagement section 31 to effectively guide the bolts 61 projecting from the mid-retainer 16, toward the predetermined positions. Therefore, the bolts 61 can be easily inserted in the corresponding installation holes 32 of the casing 14 even though the bolts 61 are integrally formed in the mid-retainer 16, thus facilitating the assembly operation and thereby lowering the production cost of the airbag restraint unit 11.

Moreover, the mid-retainer 16 is assembled in such a manner that the front-side fastening bolts 61 (located on the front windshield glass side) of the mid-retainer 16 are inserted respectively in the front-side installation holes 32 of the casing 14, and thereafter the mid-retainer 16 is turned to insert the rear-side fastening bolts 61 (located on the passenger side) respectively in the rear-side installation holes 32 of the casing 14. Accordingly, it is sufficient that the guide channels 33 are formed only at one side (the passenger side) of the casing 14 and in the shape of a bulged relief structure for the bolt 61, which structure outwardly projects from the normal outer surface of the casing 14. As a result, the casing 14 is not complicated in structure thereby suppressing a rise in production cost of the airbag restraint unit 11. Additionally, necessary minimum bulged sections are formed in the casing, thereby rendering the airbag restraint unit small-sized.

The airbag 17 is securely fixed in position in the following manner. The installation section 66 of the airbag 17 is put between the engagement section 31 of the casing 14 and the engagement sections 52 of the mid-retainer 16. The fastening bolts 61 are inserted respectively in the installation holes 66a of the airbag 17. The bulging part 68 is formed at the lower edge portion of the installation section 66 of the airbag 17 and engaged to the edge portion of each of the front-side and rear-side engagement sections 52 of the mid-retainer 16. Additionally, each of the left-side and right-side engagement pieces 58 of the mid-retainer 16 is inserted into the engagement slit 72 of each of the left-side and right-side engagement sections 71 to prevent each engagement section 71 from releasing from the mid-retainer 16. Thus, the airbag 17 is firmly fastened to the mid-retainer 16.

Each bulging part 68 of the airbag 17 is formed extending throughout the whole longitudinal length of the bottom peripheral portion defining the open mouth 65, and a stress applied to the airbag 17 during deployment of the airbag 17 can therefore be distributed to the whole longitudinal length of the bottom peripheral portion of the airbag 17, thereby securely retaining the airbag 17 in position.

Additionally, the left-side and right-side installation sections 71 of the airbag 17 are arranged such that each installation section 71 is inserted in the through-hole 55 of the mid-retainer 16 and turned up outwardly, upon which the engagement piece 58 is inserted in the engagement slit 72 to establish a secure engagement of the installation section 71 with the engagement piece 58. The installation section 71 is thus brought into a condition that it has been stretched to remove its slackness during deployment of the airbag 17. This decreases the area of a part to which gas ejected from the inflator 15 directly strikes. In other words, the turned-up installation section 71 is formed to have a thickness similar to that of the mid-retainer 16. This suppresses a thermal influence applied to the airbag 17, thereby protecting the airbag 17 from thermal damage.

Each installation section 66 of the airbag 17 is fastened between the engagement sections 52, 31 of the mid-retainer 16 and the casing 14, respectively, which engagement sections are inclined relative to the projecting direction of the airbag 17 so that the airbag 17 can be firmly retained in position. Additionally, the thus retained installation section 66 can slightly move when a large impact is applied thereto during inflation and deployment of the airbag 17, thereby softening the impact to be applied to the airbag 17, thus effectively protecting the airbag 17.

Although the airbag restraint unit 11 has been shown and described as being disposed in abutment with the instrument panel 1 in the first embodiment, it will be understood that it may be disposed in a manner that the upper-side opening 23 of the casing 14 faces a passenger seated on a front passenger seat aside a driver or may be used as an airbag restraint unit for a passenger seated on a rear passenger seat.

While the airbag 17 has been shown and described as having the bulging part 68 formed by turning up and sewing the bottom edge portion of each installation section 66 into the bag-shape and then by inserting the rod-like pin 67 into the bag-shaped bottom edge portion, it will be appreciated that the bottom edge portion of the installation section 66 may be sewn upon being folded a plurality of times so as to form the bulging or thick part at the bottom edge portion of the airbag 17.

FIGS. 8 to 17 illustrate a second embodiment of the airbag restraint unit 11 according to the present invention, which is similar to the first embodiment airbag restraint unit. In this embodiment, the airbag restraint unit 11 comprises a casing 114 encasing therein an inflator 115, a mid-retainer 116, an airbag 117 and the like.

Figure 8:
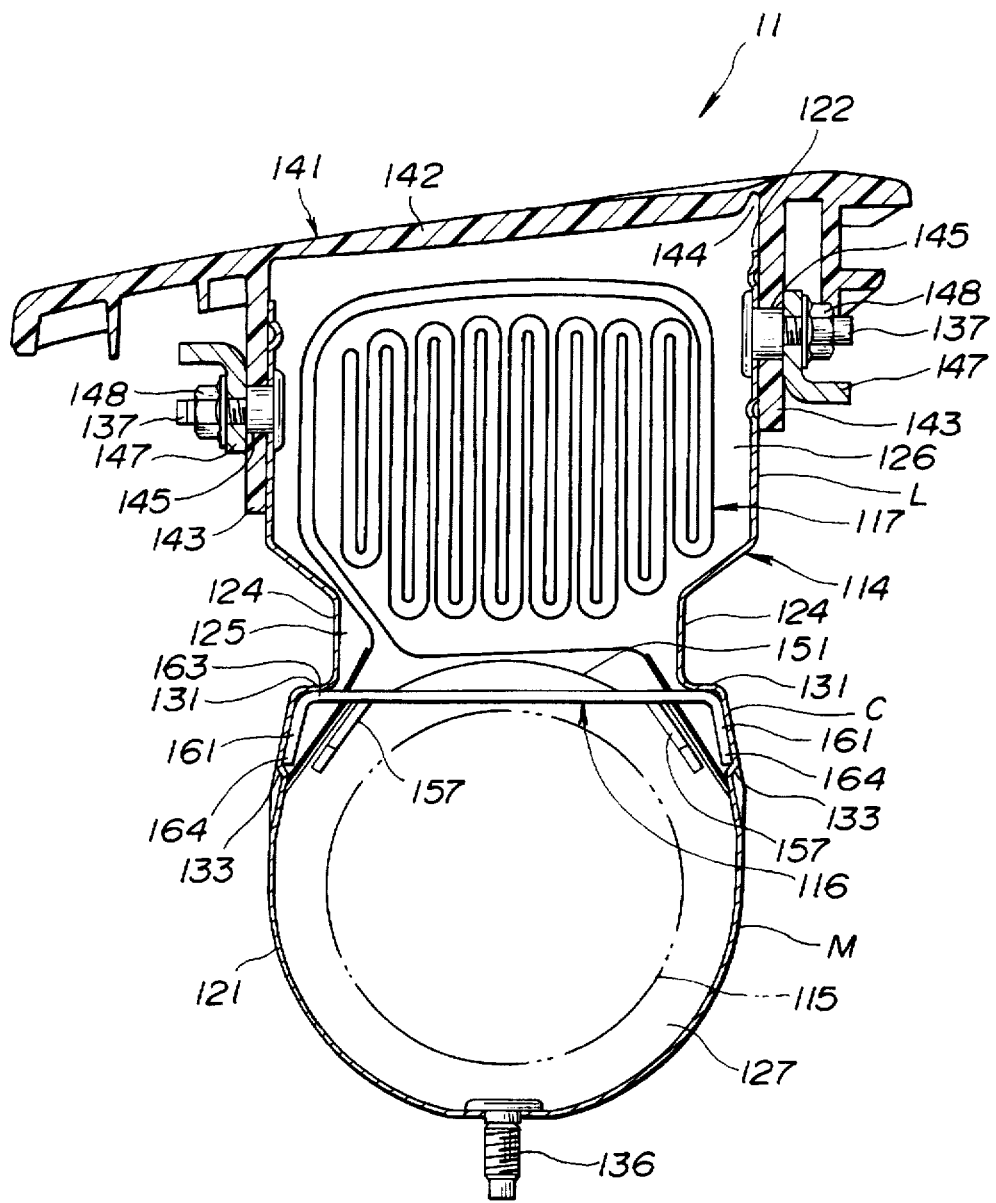
FIG. 8 is a vertical sectional view of a second embodiment of the airbag restraint unit according to the present invention, taken along a plane perpendicular to a longitudinal axis of the unit.
Figure 9:
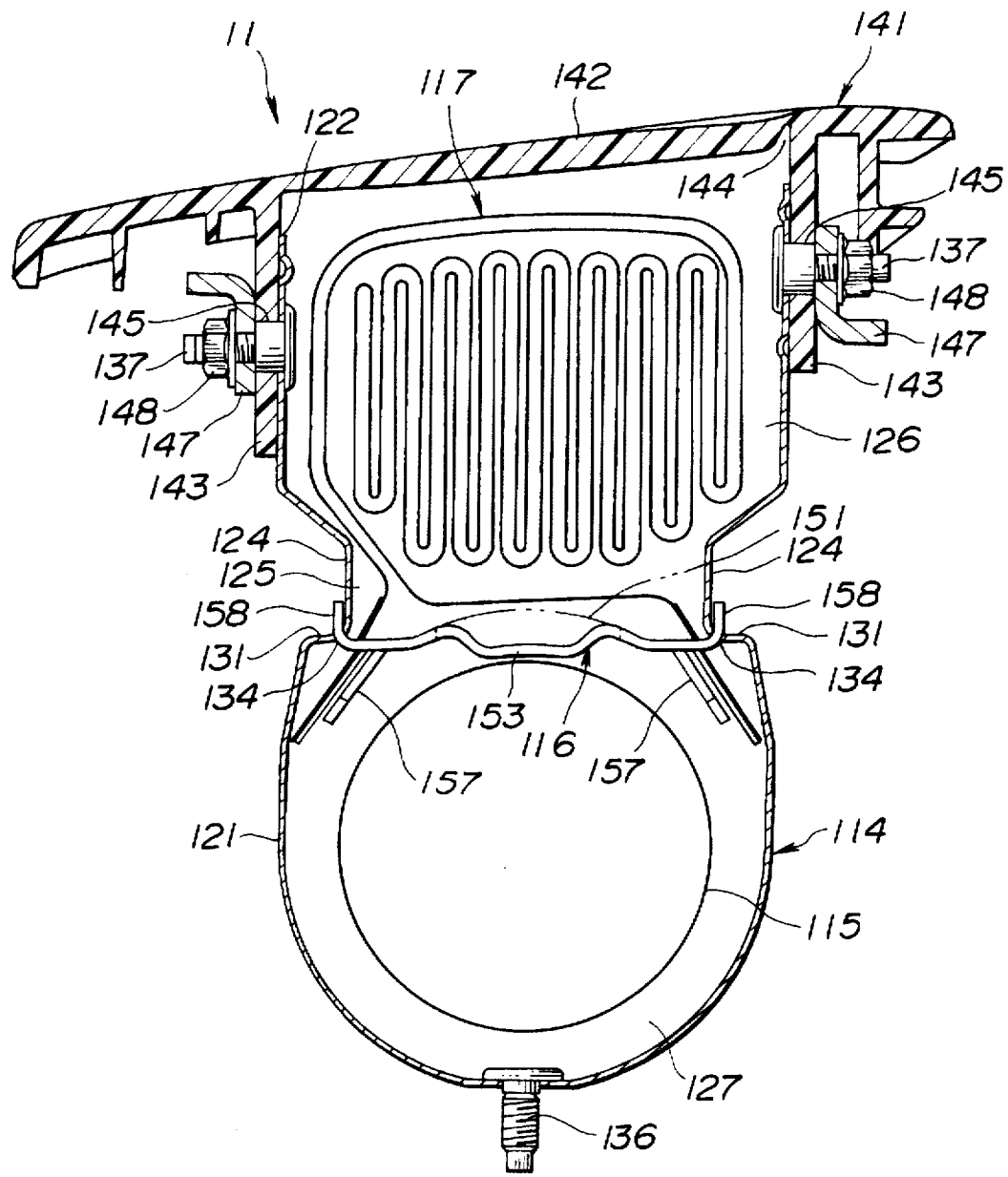
FIG. 9 is a vertical sectional view of the airbag restraint unit of FIG. 8, taken along another plane perpendicular to the longitudinal axis of the unit.
Figure 10:
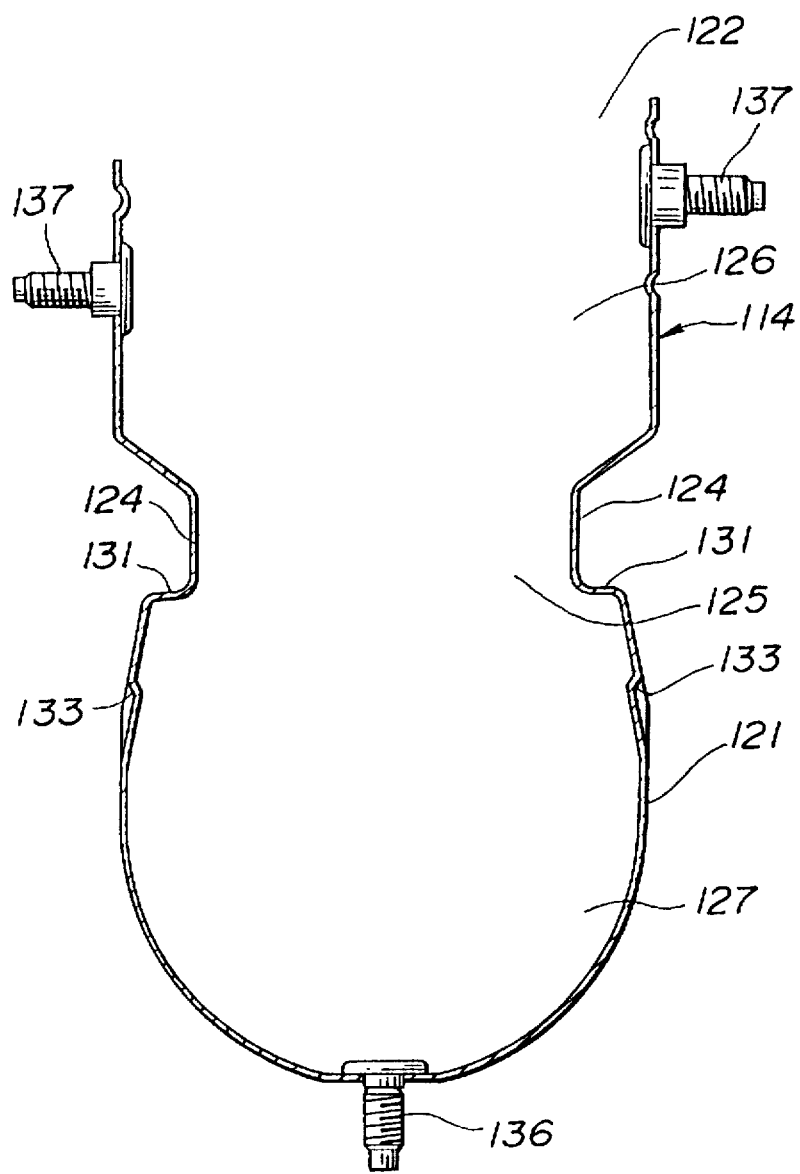
FIG. 10 is a vertical sectional view of a casing forming part of the airbag restraint unit of FIG. 8.

As shown in FIGS. 8 to 10, the casing 114 includes a laterally-extending side plate 121 having a generally U-shaped cross-section to be generally channel-shaped. The opened laterally opposite ends of the side plate 21 are covered respectively with end plates (not shown) fixed to the side plate 121 by spot welding or the like, so that the casing 114 is formed into the shape of a laterally extending container, which may be obtained by deep drawing. The side plate 121 is formed at an intermediate part (in height or depth direction) with inwardly depressed sections 124 which face with and approach each other. These inwardly depressed sections 124 define therebetween a communication space 125. Front-side and rear-side upper sections L are respectively contiguous to and located above the inwardly depressed sections 24 to define an airbag storing chamber 126 in which the airbag 117 is disposed. A generally semicylindrical lower section M is contiguous to and located below the inwardly depressed sections 124 to define thereinside an inflator storing chamber 127 in which the inflator 115 is disposed.

Front-side and rear-side outwardly projecting portions C forming part of the semicylindrical lower section M are contiguous with the depressed section 124 and face each other. Each projecting portion C extends laterally and includes a generally horizontal flat part 131, defining thereinside an upper step. Each projecting portion C further includes a ledge part 133, defining thereinside a lower step. The flat part 131 and the ledge part 133 generally vertically face each other and are integrally connected to each other through a generally vertical wall part (not identified). Each flat part 131 is formed with a plurality of engagement grooves or holes 134 located at predetermined intervals in a longitudinal or lateral direction of the casing 114.

One of the end plates of the casing 114 is formed with an inflator insertion hole (not shown) through which the inflator 115 is inserted into the inflator storing chamber 127. The inflator 115 is generally cylindrical and provided thereinside an ignitor, a propellant and the like though not shown, and is connected to impact sensors disposed at various portions of a vehicle body of the automotive vehicle. The inflator 115 is adapted to operate such that the propellant is combusted in response to a signal from the impact sensor to eject high temperature and pressure nitrogen gas through gas ejection openings (not shown) formed at the peripheral portion thereof.

A fixing bolt 136 is provided at a bottom portion of the casing lower section M. The casing 114 is installed to the vehicle body of the automotive vehicle through the fixing bolt 136. Additionally, a plurality of installation bolts 137 are provided to each of the front-side and rear-side upper sections L of the casing 114.

A cover member 141 made of a plastic is installed onto the casing 114 by means of the installation bolts 137 to cover an upper-side opening 122 of the casing 114. More specifically, the cover member 141 includes an upper plate section 142 located generally flush with an instrument panel of the automotive vehicle. Front-side and rear-side leg sections 143 are formed integral with the upper plate section 142 and project generally downwardly from the inner surface of the upper plate section 142. The front-side and rear-side leg sections 143 are respectively fitted to the outer surfaces of the front-side and rear-side upper sections L of the casing 114, in which the installation bolts 137 are inserted in through-holes 145 of the leg sections 143. A nut 148 is engaged on the installation bolt 137 and fastened together with a reinforcement plate 147, thereby tightly fixing the casing upper section L and the corresponding leg section 143 of the cover member 141. The upper plate section 142 is formed at its inner surface with a tear line 144 along which a reduced thickness linear portion is formed to allow the upper plate section 142 to tear upon inflation of the airbag 117. The tear line 144 is generally ]-shaped in plan.

Figure 11:
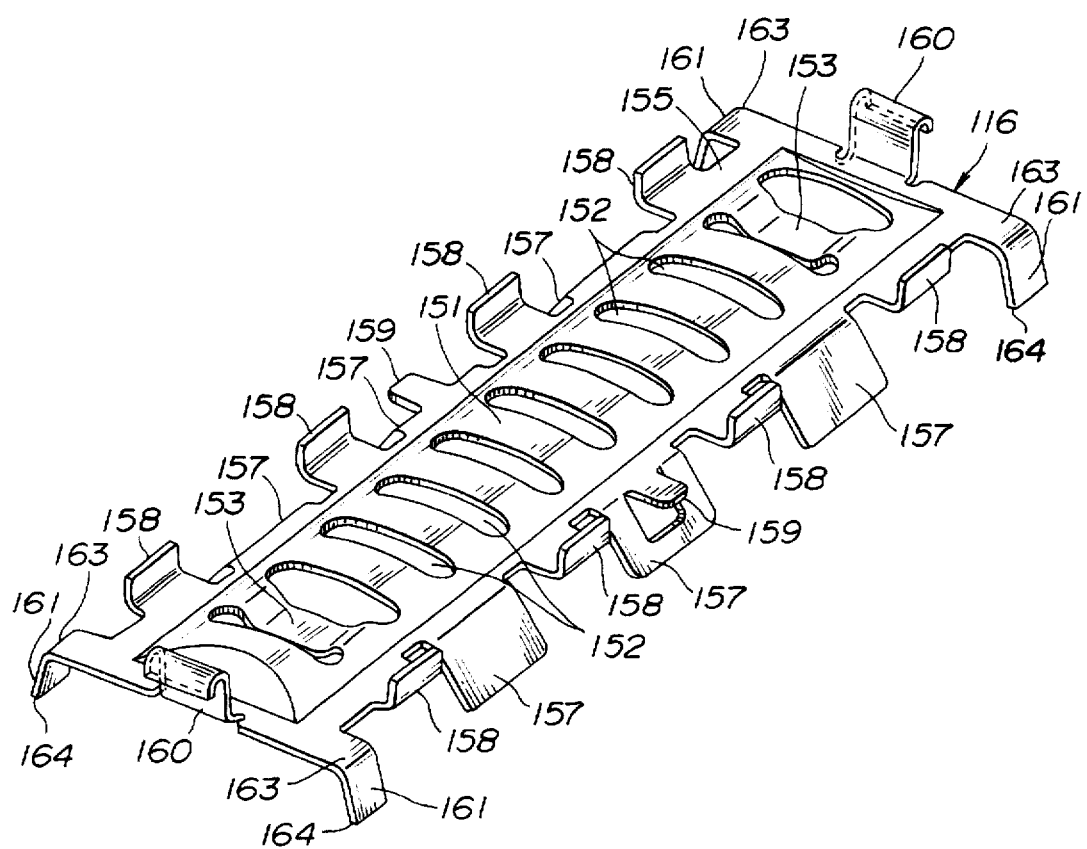
FIG. 11 is a perspective view of a mid-retainer forming part of the airbag restraint unit of FIG. 8.

As viewed in FIG. 11, the mid-retainer 116 is formed as a one-piece structure, for example, by stamping a metal sheet or plate to obtain a blank and then by bending the blank. The mid-retainer 116 is formed generally rectangular in plan and includes a base-plate section 151, which slightly projects upwardly to form an outer surface like a part of a cylindrical surface. The base-plate section 151 is formed with a plurality of through-holes 152 (through which gas passes) that are generally oval-shaped in plan and located at predetermined intervals in a longitudinal direction of the base-plate section 151. A pair of location projections 153 are formed projecting downwardly and located respectively near the longitudinally opposite ends of the mid-retainer 116. The location projections 153 are to be brought into contact with the upside surface of the inflator 115 and serve to locate the mid-retainer 116.

A flat frame section 155 is formed integrally around the base-plate section 151 and integrally provided at its longitudinal opposite side edges with auxiliary plate portions 157 and engagement piece portions 158, to which the airbag 117 is to be fixed, in which the auxiliary plate and engagement piece portions 157, 158 are alternately located along a longitudinal direction of the mid-retainer 116. A pair of the auxiliary plate portions 157 are formed on the opposite sides of base-plate section 151 and inclined such that they approach each other in a direction toward the upside. A pair of the engagement piece portions 158 are formed on the opposite sides of the base-plate section 151, in which each engagement piece portion 158 is generally L-shaped in section to have an upwardly extending part. Additionally a pair of flat engagement claw portions 159 are formed respectively at the longitudinal opposite edges and located at the longitudinally intermediate part of the frame section 155.

Each engagement claw portion 159 is formed by stamping a generally C-shaped portion in one of the auxiliary plate portions 157 along a generally C-shaped cutting line and then by bending the C-shaped portion upwardly.

Further, the frame section 155 is integrally provided with end part engagement claws 160 located at its longitudinal opposite end parts. Each engagement claw 160 extends from each longitudinal end part of the frame section 155 and bent to extend upwardly. Each engagement claw 160 is further bent downward at its tip end section so as to be generally U-shaped in section. A pair of fitting piece portions 161 are integrally formed at the longitudinal opposite side edges, respectively, and located at the longitudinal opposite end parts of the frame section 155. The pair of the fitting piece portions 161 are located at the opposite sides of the base-plate section 151. Each fitting piece portion 161 is formed generally L-shaped in section and has a generally horizontal or first contacting section 163, and a generally vertical or second contacting section 164.

The mid-retainer 116 is fixed inside the casing 114 in the following manner. Each engaging piece portion 158 is inserted in the engagement groove 134 of the casing 114, and fitted to the outer surface of the wall of the inwardly depressed section 124 of the casing 114. The first contacting section 163 and the second contacting section 164 of each fitting piece portion 161 are respectively brought into contact with the inner surface of the horizontal flat part 131 and the ledge part 133 of the outwardly projecting portion C. In this state, each location projection 153 of the mid-retainer 116 is in contact with or faces (through a slight clearance) the upper surface of the inflator 115 so that the mid-retainer 116 does not move downwardly.

Figure 12:
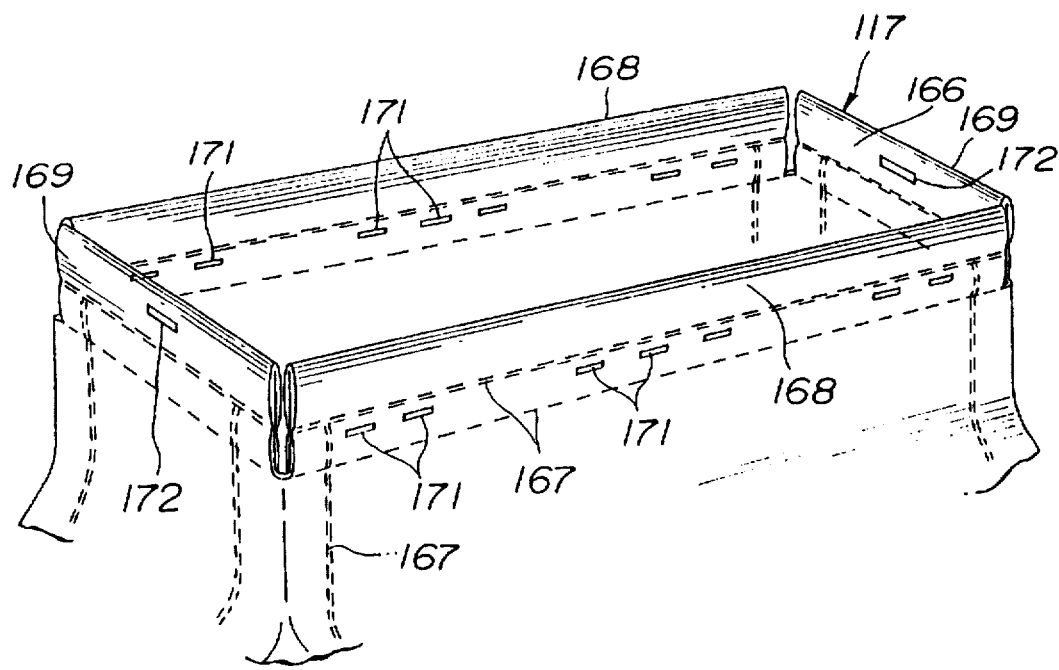
FIG. 12 is a fragmentary perspective view of an airbag forming part of the airbag restraint unit of FIG. 8.
Figure 13:
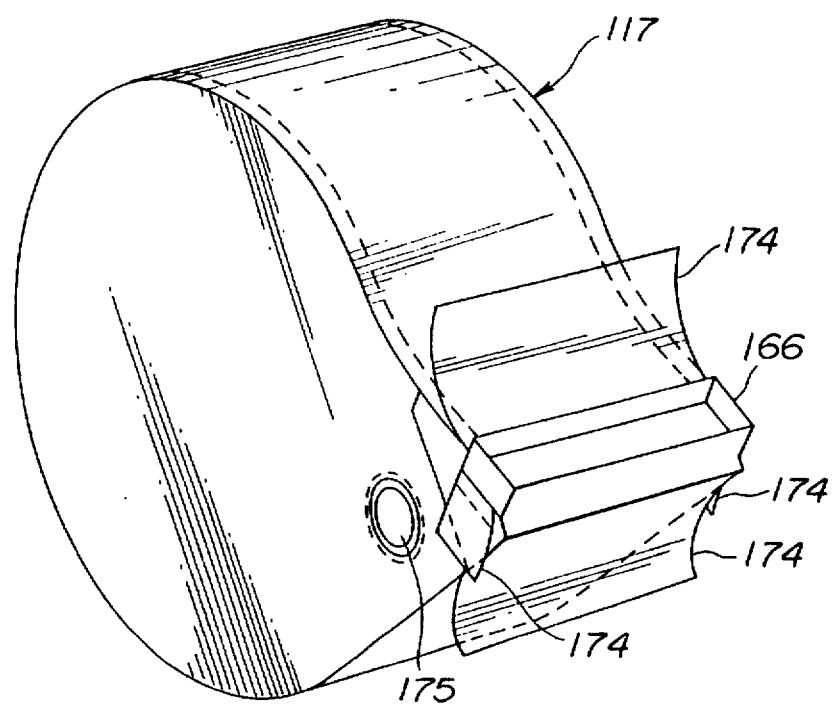
FIG. 13 is a perspective view of the airbag of FIG. 12.

As shown in FIGS. 12 and 13, the airbag 117 is formed bag-shaped to have an open mouth 166 of a generally rectangular shape, the open mouth 166 being capable of being fitted around the mid-retainer 116. In this embodiment, the airbag 117 is located on the mid-retainer 116 and stored in the airbag storing chamber 126 of the casing 114 under a state in which the airbag 117 is folded in a wave-like manner and wound in one direction. As viewed in FIG. 12, the lower part (around the open mouth 166) of the airbag 117 takes generally the shape of a pipe having a rectangular cross-section upon being fitted around the mid-retainer 116, in which the lower part of the airbag 117 has front-side and rear-side reinforced installation sections 168, and left-side and right-side reinforced installation sections 169 located near the bottom peripheral portion defining the open mouth 166. Each of the left-side and right-side reinforced installation sections 169 is perpendicular to each of the front-side and rear-side reinforced installation sections 168. Each of the front-side and rear-side reinforced installation sections 168 is fitted on the corresponding one of the front-side and rear-side edge portions of the mid-retainer 116, while each of the left-side and right-side reinforced installation sections 169 is fitted on the corresponding one of the left-side and right-side edge portions of the mid-retainer 116. Each of the reinforced installation sections 168, 169 is formed by turning up outwardly a lower part (corresponding to the section 168, 169) of the airbag 117 and then by sewing the turned-up lower part along a sewing line 167.

Each reinforced installation section 168 is formed with a plurality of engagement slits 171 aligned along the lower edge of the installation section 168, while each reinforced installation section 169 is formed with an engagement slit 172. The thus arranged airbag 117 is installed to the mid-retainer 116 in the following manner under a state where the mid-retainer 116 is positioned at the open mouth 166 of the airbag 117. Each engagement piece portion 158 and each engagement claw portion 159 of the mid-retainer 116 are engagedly inserted respectively into the corresponding engagement slits 171 of the reinforced installation section 168 of the airbag 117, while each engagement claw 160 of the mid-retainer 116 is engagedly inserted into the corresponding engagement slit 172 of the reinforced installation section 169 of the airbag 117. In this condition, each reinforced installation section 168 of the airbag 117 is located over the auxiliary plate portions 157 of the mid-retainer 116 and therefore is prevented from contacting with the inflator 115. Additionally, the airbag 117 is provided with auxiliary cloths 174 located near the open mouth 166 thereof, and is formed with a circular opening 175 through which gas filled in the airbag 117 can be vented.

The thus arranged airbag restraint unit 11 will operate as follows. When a vehicle collision or the like occurs, the impact of this collision is detected by the impact sensor thereby to operate the ignitor of the inflator 115, so that the inflator 115 ejects high temperature and pressure nitrogen gas. This gas flows through the through-holes 152 of the mid-retainer 116 to the airbag 117 thereby pushing up the airbag 117, in which the rolled-up airbag 117 comes into collision with the cover member 141 upon rotating. This opens the cover member 141 along the tear line 144, thereby forming an opening through which the airbag 117 projects. Subsequently, the gas is blown into the airbag 117, and therefore the airbag 117 inflates toward the side of the passenger or along a front windshield glass of the automotive vehicle, and deploys in front of the front seat passenger aside the driver, thereby effectively protecting the passenger from coming into direct contact with the windshield glass or the like.

Next, a manner of assembling the second embodiment airbag restraint unit 11 will be discussed mainly with reference to FIGS. 14A to 14E.

Figure 14A:
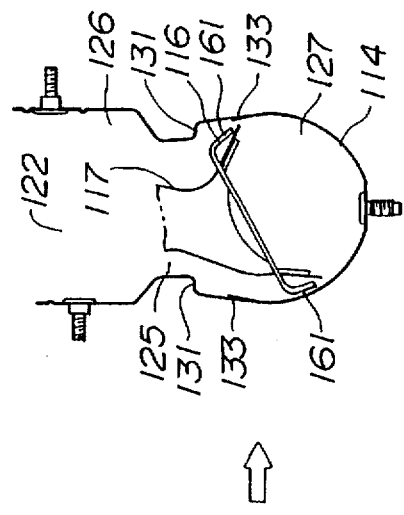
FIGS. 14A to 14E are schematic vertical sectional views showing an assembly process of the airbag restraint unit of FIG. 8.
Figure 14B:
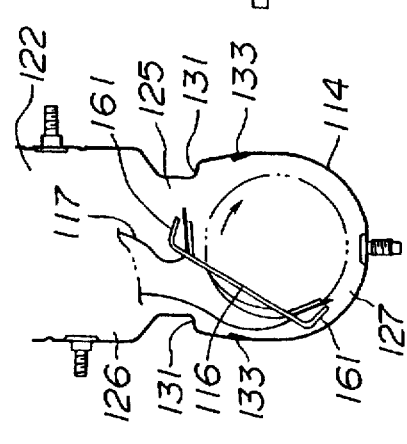

First, as shown in FIG. 14A, the mid-retainer 116 to which the airbag 117 has been already installed is inserted under an inclined state through the casing upper-side opening 122 into the empty casing 114 without the inflator 115 or the like. Then, as shown in FIG. 14B, the mid-retainer 116 upon being inclined is passed through the communication space 125 and inserted into the inflator storing chamber 127.

Figure 14C:
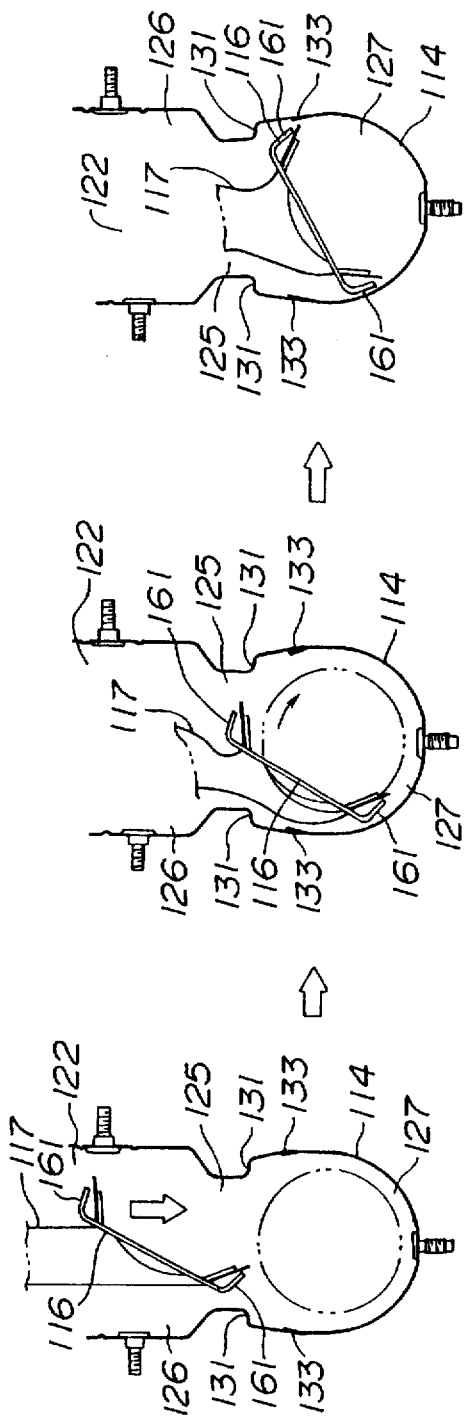
Figure 14D:
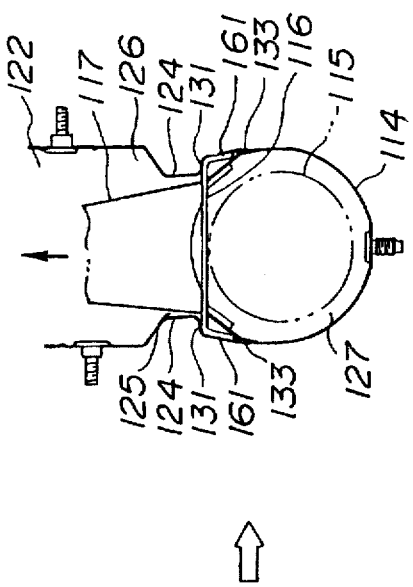
Figure 14E:
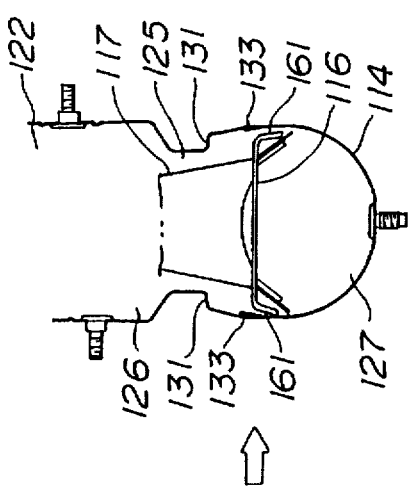

Subsequently, as shown in FIGS. 14C and 14D, the mid-retainer 116 is turned to a position at which the mid-retainer 116 is generally parallel with the communication space 125 of the casing 114. Then, as shown in FIG. 14E, the mid-retainer 116 is drawn up or pushed up making its parallel displacement, so that the fitting piece portions 161 formed at the opposite end parts of the mid-retainer 116 are brought into contact with and ride on the ledge parts 133 of the casing 114 under an elastic deformation of at least one of the mid-retainer 116 and the casing 114.

In this state, the mid-retainer 116 is fixedly secured inside the casing 114 in such a manner that each engagement piece portion 158 is inserted in the engagement groove or hole 134 of the casing 114 so as to be fitted to the depressed section 124, while the first contacting section 163 and the second contacting section 164 of each fitting piece portion 161 are respectively brought into contact with the lower surface of the horizontal flat part 131 and the upper surface of the ledge part 133 of the outwardly projecting portion C of the casing 114.

Thereafter, the airbag 117 is folded and stored in the airbag storing chamber 126. Then, the cover member 141 is mounted on the casing 114 to cover the upper-side opening 122. Finally, the inflator 115 is inserted and stored in the inflator storing chamber 127 of the casing 114, thus completing the assembly process of the airbag restraint unit 11. In this state, the location projections 153 of the mid-retainer 116 are in contact with or face (through a slight clearance) the upper surface of the inflator 115, thereby preventing the mid-retainer 116 from its downward displacement.

According to the second embodiment airbag restraint unit 11, the inflator 115, the mid-retainer 116 and the airbag 117 are stored in the one-piece structure casing 114, and therefore the number of components parts and steps of a production process can be reduced, thereby lowering the production cost of the airbag restraint unit 11.

Furthermore, by virtue of the mid-retainer 116 being interposed between the inflator 115 and the airbag 117, the folded airbag 117 is maintained at a suitable position separate from the inflator 115, thereby preventing the airbag 117 from contacting with the inflator 115, thus protecting the airbag 117 from high temperature gas. This allows the airbag 117 to be formed of a relatively thin material, thereby contributing to making the airbag restraint unit 11 smaller and lighter. Particularly in the second embodiment, the lower end portion of the airbag 117 is kept in its inclined state under the action of the auxiliary plate portions 157 of the mid-retainer 116, and therefore it can be securely prevented from coming into contact with the inflator 115.

The mid-retainer 116 provided with the airbag 117 can be installed to the casing 114 with a one-touch action or in a snap-fit manner, thereby reducing the number of component parts and steps of the production process of the airbag restraint unit 11 while lowering the production cost of the airbag restraint unit 11.

Additionally, the airbag 117 can be engaged with and installed to the mid-retainer 116 without using separate fastening members, such as bolts or rivets, and therefore the number of component parts and steps of the production process can be effectively reduced.

Furthermore, the casing 114 is constructed so as to function to fix the inflator 115 in position, to fix the mid-retainer 116 in position, to store the airbag 117 therein and to fix the cover member 141 in position and serve as a pressure container for the inflator 115. This contributes to reducing the number of component parts and steps of the production process while contributing to lowering the production cost of the airbag restraint unit 11.

The casing 114 is formed with the outwardly projecting part C having the horizontal flat part 131 with which the mid-retainer 116 is brought into contact, and therefore the mid-retainer 116 and the airbag 117 can be securely retained in position thereby obtaining a high reliability even though the retaining structure is simple in construction.

Further, according to this embodiment, the mid-retainer 116 can be effectively prevented from having a longitudinal play as a result of the action of the respective engagement piece portions 158 inserted in the engagement groove or holes 134 of the casing 114.

The reinforced installation sections 168 of the airbag 117 are maintained over the auxiliary plate portions 157, and therefore the airbag 117 can be prevented from directly contacting with inflator 115 while preventing the leakage of gas ejected from the inflator 115, thereby effectively introducing the gas into the airbag 117.

The mid-retainer 116 is provided with the location projections 153 so as to be in contact with or face (through a slight clearance) the upper part of the outer peripheral surface of the inflator 115. Accordingly, the mid-retainer 116 can be stably fixed in position.

Thus, the airbag restraint unit 11 of this embodiment does not require separate fastening members, such as rivets or the like, thereby reducing the number of component parts. Additionally, the assembly operation of the main component parts of the airbag restraint unit 11 can be accomplished by snap action, reducing the cost required for assembling facilities, thereby lowering the production cost, and the reliability of the airbag restraint unit 11 can be increased while simplifying the construction of the same.

Figure 15:
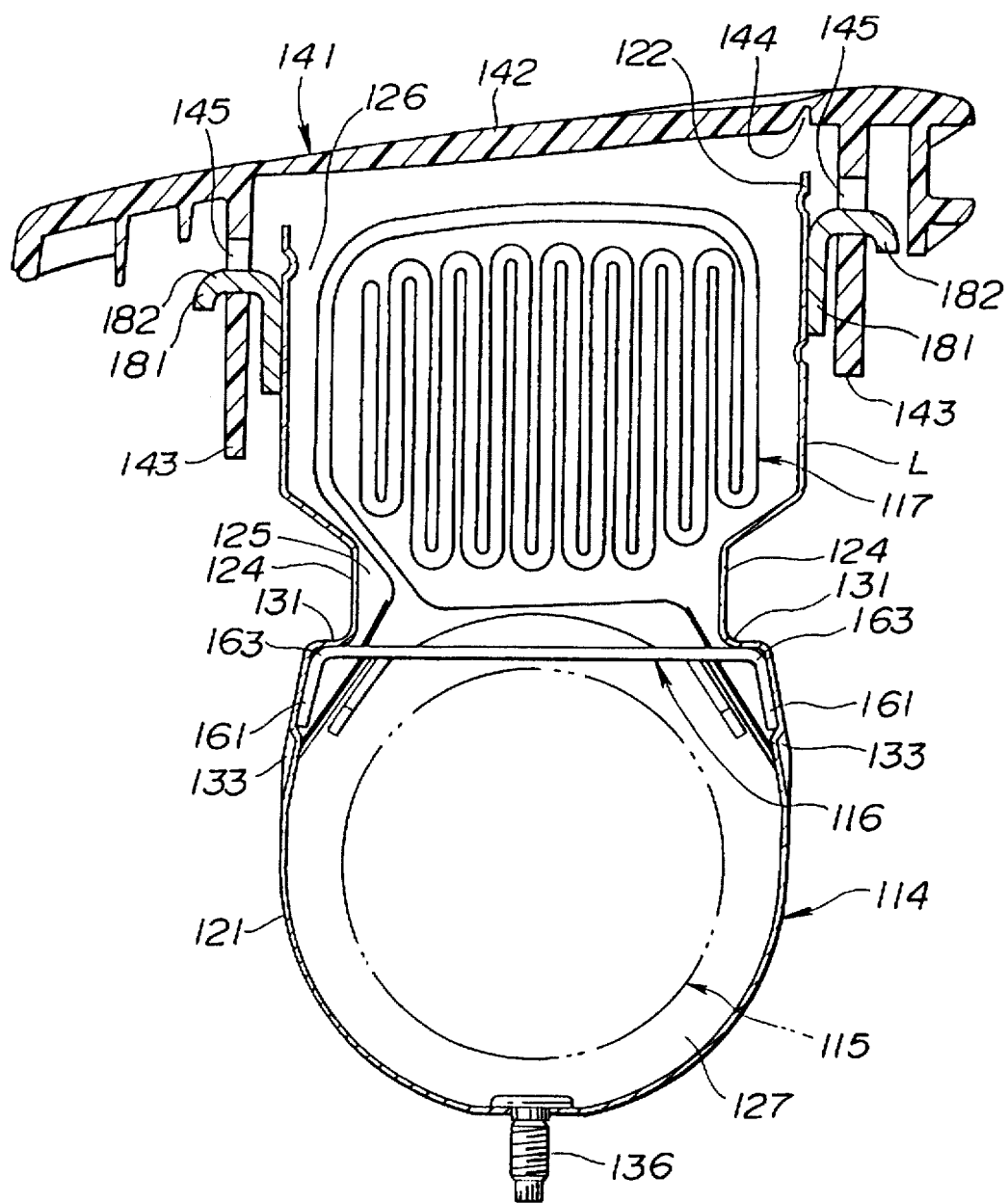
FIG. 15 is a vertical sectional view of a modified example of the second embodiment airbag restraint unit of FIG. 8.

While the cover member 141 formed of a plastic has been shown and described as being installed to the upper sections L of the casing 114 by using the installation bolts 137 installed to the casing upper sections L in the second embodiment, it will be appreciated that the cover member 141 may be installed in a manner shown in FIG. 15 in which reinforcing plates 181 are fixed to the casing upper sections L by spot welding or the like. Each reinforcing plate 181 has an engagement section 182 having a generally U-shaped cross-section. The engagement section 182 is engaged in a through-hole 145 formed in each leg section 143 of the cover member 141 so that the cover member 141 is fixedly secured to the casing 114. This arrangement manner can reduce the number of component parts and facilitate the assembly operation while reinforcing the casing 114, thereby preventing the casing 114 from being deformed during deployment of the airbag 117.

Figure 16:
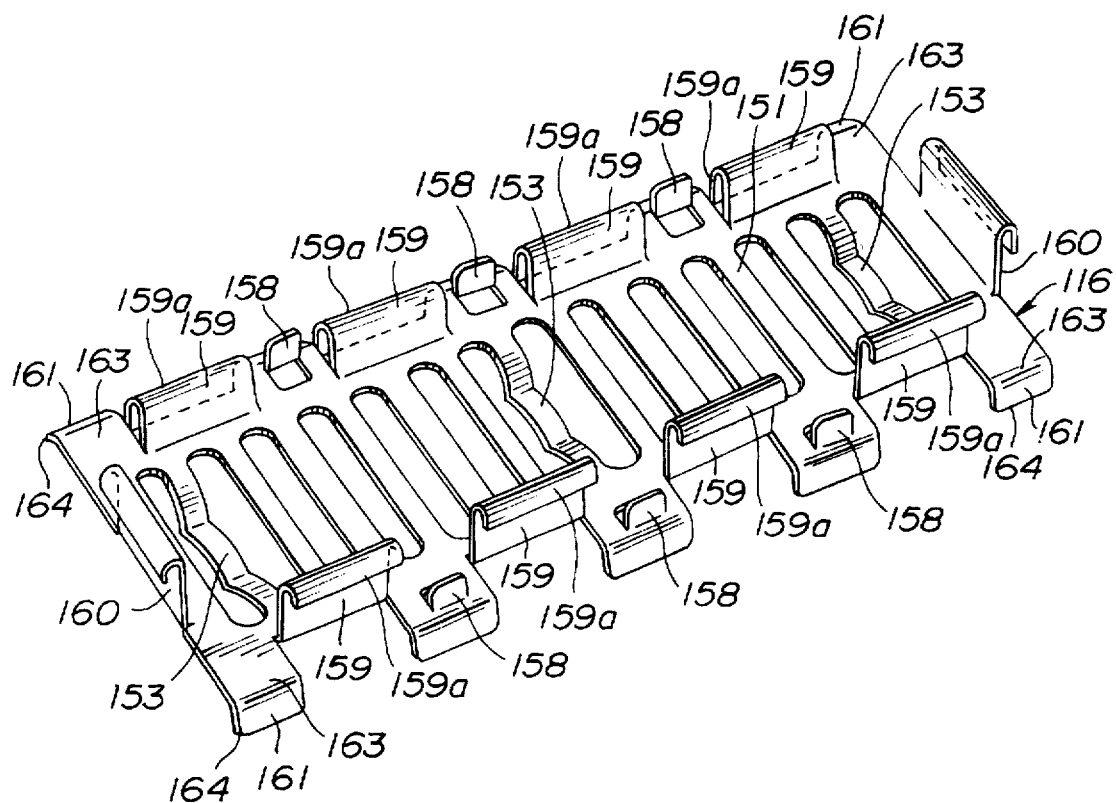
FIG. 16 is a perspective view of a mid-retainer forming part of another modified example of the airbag restraint unit of FIG. 8.
Figure 17:
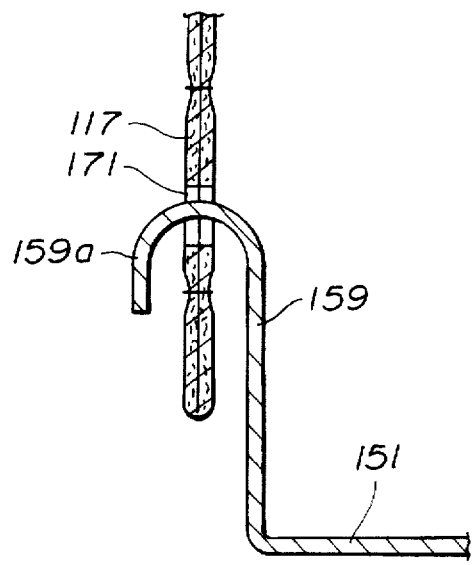
FIG. 17 is an enlarged fragmentary sectional view showing a connection manner between the airbag and the mid-retainer in the airbag restraint unit of FIG. 16.

Furthermore, although the mid-retainer 116 has been described as being arranged as shown in FIG. 11, it will be understood that the mid-retainer 116 may be arranged as shown in FIGS. 16 and 17 in which each engagement claw portion 159 is raised upwardly and formed at its tip end with a hook section 159a, which is to be engaged in the engagement slit 171 of the airbag 117. In this arrangement, the base-plate section 151 of the mid-retainer 116 is formed in the flat-plate shape and has three location projections 153. Further, the mid-retainer 116 is provided at each of the front-side and rear-side edge portions with a plurality of (five) fitting piece portions 161 aligned at predetermined intervals, with each of three fitting pieces 161 formed with an upwardly raising engagement piece portion 158, which is formed by cutting a generally C-shaped part of the engagement piece portion 158 and then by raising the C-shaped part.

While the airbag restraint unit 11 has been shown and described as being installed in the instrument panel of the automotive vehicle in the above embodiment, it will be appreciated that the airbag restraint unit 11 may be so disposed that its upper side opening 122 of the casing 114 faces the front seat passenger, or may be used as one for a rear seat passenger.

What is claimed is:

1. An airbag restraint unit comprising:

a casing;

an inflator for ejecting gas, disposed in the casing;

an airbag adapted to inflate and deploy upon the inflator supplying the gas, the airbag being disposed in the casing; and a mid-retainer disposed in the casing and located between the inflator and the airbag, wherein the casing includes a first engagement section having first and second engagement surfaces, which are opposite to each other, wherein the mid-retainer includes a second engagement section having opposite first and second engagement surfaces engageable respectively with the first and second engagement surfaces of the first engagement section, wherein at least one of the casing and mid-retainer includes means for fastening the mid-retainer to the casing so that the first and second engagement surfaces of the second engagement section respectively engage the first and second engagement surfaces of the first engagement section, the fastening means being formed integral with at least one of the casing and the mid-retainer, wherein the fastening means includes first and second installation holes formed respectively at the first and second engagement surfaces of the first engagement section, and further includes first and second fastening members projecting respectively from the first and second engagement surfaces of the second engagement section, the first and second fastening members being inserted into the first and second installation holes, wherein said casing includes means for guiding said first fastening member along the inner periphery of said casing toward the first engagement surface of said first engagement section.

2. An airbag restraint unit as claimed in claim 3, wherein said airbag includes first and second installation sections, said first installation section being positioned between the first engagement surfaces of said first and second engagement sections, said second installation section being positioned between the second engagement surfaces of said first and second engagement sections, said first and second installation sections being formed respectively with first and second installation holes where said first and second fastening members of said mid-retainer are respectively inserted.

3. An airbag restraint unit as claimed in claim 2, wherein each of said first and second installation sections includes a bulging part that extends longitudinally thereof and is engageable with an edge portion of said mid-retainer to securely fix each of said first and second installation sections in position.

4. An airbag restraint unit as claimed in claim 2, wherein said mid-retainer includes a though-hole through which the gas passes and first and second engagement pieces located at opposite end sections of the mid-retainer and projecting toward said airbag, wherein said airbag further includes third and fourth installation sections engaged respectively with said first and second engagement pieces of said mid-retainer.

5. An airbag restraint unit comprising:

a casing;

an inflator for ejecting gas, disposed in the casing;

an airbag adapted to inflate and deploy upon the inflator supplying the gas, the airbag being disposed in the casing; and a mid-retainer disposed in the casing and located between the inflator and the airbag, wherein the casing includes a first engagement section having first and second engagement surfaces, which are opposite to each other, wherein the mid-retainer includes a second engagement section having opposite first and second engagement surfaces engageable respectively with the first and second engagement surfaces of the first engagement section, wherein at least one of the casing and mid-retainer includes means for fastening the mid-retainer to the casing so that the first and second engagement surfaces of the second engagement section respectively engage the first and second engagement surfaces of the first engagement section, the fastening means being formed integral with at least one of the casing and the mid-retainer, wherein the fastening means includes first and second fitting grooves formed at an inner surface of the casing, the first and second engagement surfaces of the first engagement section being formed respectively at the first and second fitting grooves, the fastening means further including first and second fitting sections at which the first and second engagement surfaces of the second engagement section are respectively formed, the first and second fitting sections being securely fitted respectively in the first and second fitting grooves, and wherein said airbag is formed with first and second slits, wherein said mid-retainer includes first and second engagement claw portions respectively located near said first and second fitting sections, said first and second engagement claw portions being respectively insertable in said first and second slits.

6. An airbag restraint unit as claimed in claim 5, wherein said fitting grooves include first and second engaging parts forming part of a wall of said casing, said first and second engaging parts facing each other to define therebetween each of said fitting grooves, wherein each of said fitting sections of said mid-retainer includes first and second end portions engageable respectively with said first and second engaging parts.

7. An airbag restraint unit as claimed in claim 5, wherein said mid-retainer includes first and second airbag installation sections respectively located near said first and second fitting sections, said airbag being fixed to said first and second airbag installation sections.

8. An airbag restraint unit as claimed in claim 5, wherein said casing is of a one-piece structure and includes an inflator storing chamber where said inflator is disposed, and an airbag storing chamber where said airbag is disposed.

9. A method of producing an airbag restraint unit, which includes a casing having an intermediate part with a first engagement section, first and second chambers defined in said casing and on opposite sides of said intermediate part, said first chamber being opened at one end; an inflator for ejecting gas, disposed in said second chamber; an airbag adapted to inflate and deploy upon the inflator supplying the gas, said airbag being disposed in said first chamber; a mid-retainer disposed in said casing and located between said inflator and said airbag, said mid-retainer having a second engagement section engageable with said first engagement section, and an installation section to which said airbag is fixable, said method comprising the steps of:
  installing said airbag to said mid-retainer at said installation section;
  inserting said mid-retainer in an inclined state through the open end of said casing into the second chamber, said mid-retainer being inclined relative to an installed state where said mid-retainer is securely installed to said casing;
  turning said mid-retainer in a direction toward the installed state; and
  bringing said second engagement section of said mid-retainer into engagement with said first engagement section of said casing to obtain said installed state.

10. A method of producing an airbag restraint unit, which includes a casing having an intermediate part having a first engagement section and an installation hole, first and second chambers defined in said casing and on opposite sides of said intermediate part, said first chamber being opened at one end; an inflator for ejecting gas, disposed in said second chamber; an airbag adapted to inflate and deploy upon the inflator supplying the gas, said airbag being disposed in said first chamber; a mid-retainer disposed in said casing and located between said inflator and said airbag, said mid-retainer having a second engagement section engageable with said first engagement section, and a fastening member insertable in said installation hole of said casing, said method comprising the steps of:
  inserting said mid-retainer in an inclined state through the open end of said casing into the second chamber, said mid-retainer being inclined relative to an installed state where said mid-retainer is securely installed to said casing;
  inserting said fastening member of said mid-retainer in said installation hole of said casing;
  turning said mid-retainer in a direction toward the installed state; and
  bringing said engagement section of said mid-retainer into engagement with said engagement section of said casing.

11. A method as claimed in claim 10, wherein said turning step includes slidably fitting said second engagement section of said mid-retainer in a guide channel formed along an inner surface of said casing, and moving said second engagement section of said mid-retainer along said guide channel toward said engagement section of said casing.

12. A method of producing an airbag restraint unit, which includes a casing of a one-piece structure, having an intermediate part with a first engagement section, first and second chambers defined in said casing and on opposite sides of said intermediate part, said first chamber being opened at one end, said first engagement section having first and second fitting grooves facing each other; an inflator for ejecting gas, disposed in said second chamber; an airbag adapted to inflate and deploy upon the inflator supplying the gas, said airbag being disposed in said first chamber; a mid-retainer disposed in said casing and located between said inflator and said airbag, said mid-retainer having a second engagement section engageable with said first engagement section, and an installation section to which said airbag is fixable, said second engagement section having first and second fitting sections located at opposite edge portions of said mid-retainer, said method comprising the steps of:
  installing said airbag to said mid-retainer at said installation section;
  inserting said mid-retainer into said casing through the open end of said casing;
  passing said mi-retainer in an inclined state between the first and second fitting grooves at the intermediate part of said casing, said mid-retainer being inclined relative to an installed state where said mid-retainer is securely fitted inside said casing;
  turning said mid-retainer to a position parallel with a plane passing through said first and second fitting grooves; and
  bringing said first and second fitting sections of said mid-retainer in fitting contact respectively with said first and second fitting grooves of said casing to establish the installed state.

* * * * *